United States Patent
Michelini et al.

(10) Patent No.: US 12,322,158 B2
(45) Date of Patent: Jun. 3, 2025

(54) UNDECIMATED IMAGE PROCESSING METHOD AND DEVICE

(71) Applicant: BOE Technology Group Co., Ltd., Beijing (CN)

(72) Inventors: Pablo Navarrete Michelini, Beijing (CN); Yunhua Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/781,182

(22) PCT Filed: Jun. 25, 2021

(86) PCT No.: PCT/CN2021/102515
§ 371 (c)(1),
(2) Date: May 31, 2022

(87) PCT Pub. No.: WO2022/267046
PCT Pub. Date: Dec. 29, 2022

(65) Prior Publication Data
US 2024/0185570 A1    Jun. 6, 2024

(51) Int. Cl.
G06V 10/75    (2022.01)
G06V 10/77    (2022.01)
G06V 10/82    (2022.01)

(52) U.S. Cl.
CPC .......... *G06V 10/7715* (2022.01); *G06V 10/82* (2022.01)

(58) Field of Classification Search
CPC .... G06V 10/7715; G06V 10/82; G06V 10/75; G06N 3/0464
See application file for complete search history.

(56) References Cited

U.S. PATENT DOCUMENTS

2019/0303715 A1    10/2019    Jiang et al.
2022/0084166 A1    3/2022    Navarrete Michelini et al.

FOREIGN PATENT DOCUMENTS

CN    107610140 A    1/2018
CN    110222716 A    9/2019
(Continued)

OTHER PUBLICATIONS

Michelini, Pablo Navarrete, et al. "Mgbpv2: Scaling up multi-grid back-projection networks." 2019 IEEE/CVF International Conference on Computer Vision Workshop (ICCVW). IEEE, 2019. (Year: 2019).*

(Continued)

*Primary Examiner* — Amandeep Saini
*Assistant Examiner* — Denise G Alfonso
(74) *Attorney, Agent, or Firm* — IPro, PLLC

(57) ABSTRACT

An undecimated image processing method includes: acquiring an image to be processed, inputting the image to be processed into an image processing network, to obtain an output image, where a resolution of the output image is the same with a resolution of the image to be processed. The inputting the image to be processed into the image processing network to obtain the output image includes: inputting the image to be processed into an analysis module to perform feature analysis, and outputting a feature tensor image; inputting the feature tensor image into a processing module, and outputting a processed feature tensor image; and synthesizing, by a synthesis module, at least one feature tensor image outputted by the at least one processing module to obtain the output image.

20 Claims, 4 Drawing Sheets

C) Channel-wise concatenation

(56) References Cited

FOREIGN PATENT DOCUMENTS

| | | |
|---|---|---|
| CN | 110245747 A | 9/2019 |
| CN | 110717851 A | 1/2020 |

OTHER PUBLICATIONS

Huang, Gao, et al. "Densely connected convolutional networks." Proceedings of the IEEE conference on computer vision and pattern recognition. 2017.
Michelini, Pablo Navarrete, et al. "Mgbpv2: Scaling up multi-grid back-projection networks." 2019 IEEE/CVF International Conference on Computer Vision Workshop (ICCVW). IEEE, 2019.

* cited by examiner

UNDECIMATED IMAGE PROCESSING METHOD AND DEVICE

CROSS REFERENCE TO RELATED APPLICATIONS

This application is the U.S. national phase of PCT Application No. PCT/CN2021/102515 filed on Jun. 25, 2021, which is incorporated by reference herein in its entirety.

TECHNICAL FIELD

The present disclosure relates to the field of image processing technology, in particular to an undecimated image processing method and device.

BACKGROUND

A Convolutional Neural Network, or simply Convolutional Network, is a neural network structure that uses images as input/outputs and replaces scalar weights by filters (convolutions).

During image processing, need to perform the extraction such decimation operations as up-sampling, down-sampling (e.g., pooling), are required in a conventional convolutional neural network. However, information in a feature map may be lost in the decimation operations, resulting in distortion of image processing results.

SUMMARY

In a first aspect, an undecimated image processing method is provided, including: acquiring an image to be processed, inputting the image to be processed into an image processing network, to obtain an output image, where a resolution of the output image is the same with a resolution of the image to be processed. The image processing network includes: an analysis module, a synthesis module and at least one processing module, and the inputting the image to be processed into the image processing network to obtain the output image includes: inputting the image to be processed into the analysis module to perform feature analysis, and outputting a feature tensor image; inputting the feature tensor image into the processing module for processing, and outputting a processed feature tensor image, where a resolution of the feature tensor image outputted by the processing module is the same with the resolution of the image to be processed; and synthesizing, by the synthesis module, at least one feature tensor image outputted by the at least one processing module to obtain the output image.

In a possible embodiment of the present disclosure, the image processing network includes a plurality of analysis modules, and the inputting the image to be processed into the analysis module to perform feature analysis and outputting the feature tensor image, includes: inputting the image to be processed into the plurality of analysis modules to perform feature analysis and outputting feature tensor images each having the predetermined quantity of channels, where the quantities of channels of the feature tensor images outputted by the analysis modules are different from each other.

In a possible embodiment of the present disclosure, each processing module includes: a plurality of micro upscaling modules and a plurality of micro downscaling modules, and the plurality of micro upscaling modules and the plurality of micro downscaling modules are coupled to each other to form the processing module, the inputting the feature tensor image into the processing module for processing and outputting the processed feature tensor image, includes: inputting the feature tensor image into each micro upscaling module for micro upscaling processing, and outputting a micro-upscaling-processed feature tensor image, where the quantity of channels of the feature tensor image outputted by the micro upscaling module is less than the quantity of channels of the inputted feature tensor image, and a resolution of the feature tensor image outputted by the micro upscaling module is greater than a resolution of the inputted feature tensor image; inputting the feature tensor image into each micro downscaling module for micro downscaling processing, and outputting a micro-downscaling-processed feature tensor image, where the quantity of channels of the feature tensor image outputted by the micro downscaling module is greater than the quantity of channels of the inputted feature tensor image, and a resolution of the feature tensor image outputted by the micro downscaling module is less than the resolution of the inputted feature tensor image. The plurality of analysis modules is sequentially arranged in an order where the quantities of output channels are from large to small, and in each processing module, the feature tensor image outputted by each analysis module and feature tensor images outputted by all previous analysis modules and a last analysis module that are processed by the micro upscaling modules and/or the micro downscaling modules are concatenated and outputted.

In a possible embodiment of the present disclosure, the synthesizing at least one feature tensor image outputted by the at least one processing module by the synthesis module to obtain the output image includes: synthesizing, by the synthesis module, the at least one feature tensor image to obtain the output image of a same format as the image to be processed, where the quantity of channels of the output image is the same with the quantity of channels of the image to be processed.

In a possible embodiment of the present disclosure, the image processing network includes a plurality of processing modules connected in sequence, and an output of a previous processing module serves as an input of a subsequent processing module.

In a possible embodiment of the present disclosure, the quantities of output channels of two adjacent analysis modules are of an M times relationship, where M is an integer greater than one.

In a possible embodiment of the present disclosure, the analysis module is implemented by using a single convolution layer.

In a possible embodiment of the present disclosure, the synthesis module is implemented by using a single convolution layer.

In a possible embodiment of the present disclosure, each micro upscaling module is implemented by using a transposed convolution layer with a stride of 1.

In a Possible Embodiment of the Present Disclosure, Each Micro Downscaling Module is Implemented by Using a Convolution Layer with a Stride of 1.

In a possible embodiment of the present disclosure, a ratio of the resolution of the feature tensor image outputted by each micro upscaling module to the resolution of the feature tensor image inputted into the micro upscaling module is $1+\varepsilon$, where $\varepsilon$ is a value greater than zero and less than one.

In a possible embodiment of the present disclosure, a ratio of the resolution of the feature tensor image inputted into each micro downscaling module to the resolution of the feature tensor image outputted by the micro downscaling module is 1+ε, where ε is a value greater than zero and less than one.

In a second aspect, an undecimated image processing device is provided, including: an acquisition unit, configured to acquire the image to be processed, an execution unit, configured to input the image to be processed into an image processing network to obtain the output image, where a resolution of the output image is the same with a resolution of the image to be processed. The image processing network includes: an analysis module, a synthesis module and at least one processing module, the inputting the image to be processed into the image processing network to obtain the output image includes: inputting the image to be processed into the analysis module to perform the feature analysis, and outputting a feature tensor image; inputting the feature tensor image into the processing module for processing and outputting a processed feature tensor image, where a resolution of the feature tensor image outputted by the processing module is the same with the resolution of the image to be processed; and synthesizing, by the synthesis module, at least one feature tensor image outputted by the at least one processing module to obtain the output image.

In a third aspect, an electronic device is provided, including a processor, a memory, and a program or an instruction stored on the memory and executable on the processor, the program or instruction is executed by the processor to perform the above-mentioned undecimated image processing method.

In a fourth aspect, a non-transitory computer readable storage medium having stored thereon a program or an instruction is provided, the program or the instruction is executed by the processor to perform the above-mentioned undecimated image processing method.

BRIEF DESCRIPTION OF THE DRAWINGS

Through the detailed description mentioned hereinafter, the and other advantages and benefits will be apparent to a person skilled in the art. The following drawings are for illustrative purposes only, but shall not be construed as limiting the present disclosure. In the drawings, a same reference numeral represents a same member. In these drawings.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

Figure 1:
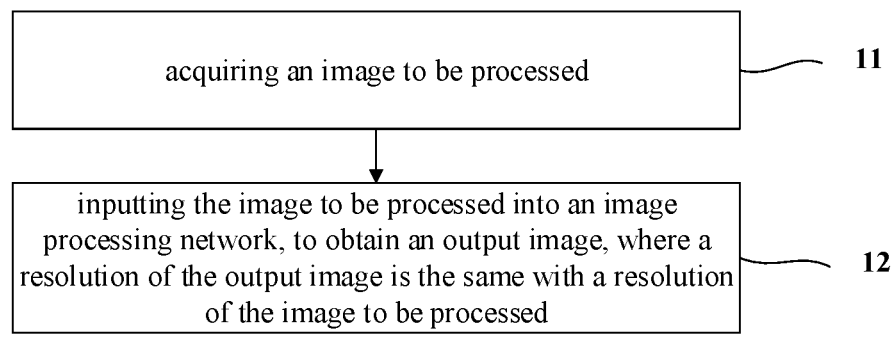
FIG. 1 is a flowchart of an image processing method according to an embodiment of the present disclosure.

FIG. 1 is a flowchart of an image processing method according to an embodiment of the present disclosure. The undecimated image processing method includes the following steps.

Step 11, acquiring an image to be processed.

Step 12, inputting the image to be processed into an image processing network, to obtain an output image, where a resolution of the output image is the same with a resolution of the image to be processed.

The image processing network includes: an analysis module, a synthesis module and at least one processing module, and the inputting the image to be processed into the image processing network to obtain the output image includes: inputting the image to be processed into the analysis module to perform feature analysis, and outputting a feature tensor image; inputting the feature tensor image into the processing module for processing, and outputting a processed feature tensor image, where a resolution of the feature tensor image outputted by the processing module is the same with the resolution of the image to be processed; and synthesizing, by the synthesis module, at least one feature tensor image outputted by the at least one processing module to obtain the output image.

In the embodiments of the present disclosure, "undecimated" refers to that such decimation operations as up-sampling, down-sampling (e.g., pooling), are not performed during the image processing.

In the embodiment of the present disclosure, the processing module in the image processing network performs the undecimated operation on the inputted feature tensor image, so as to avoid information loss of the feature tensor image caused by the decimation operation in the image processing process and improve an image processing effect.

Figure 2:
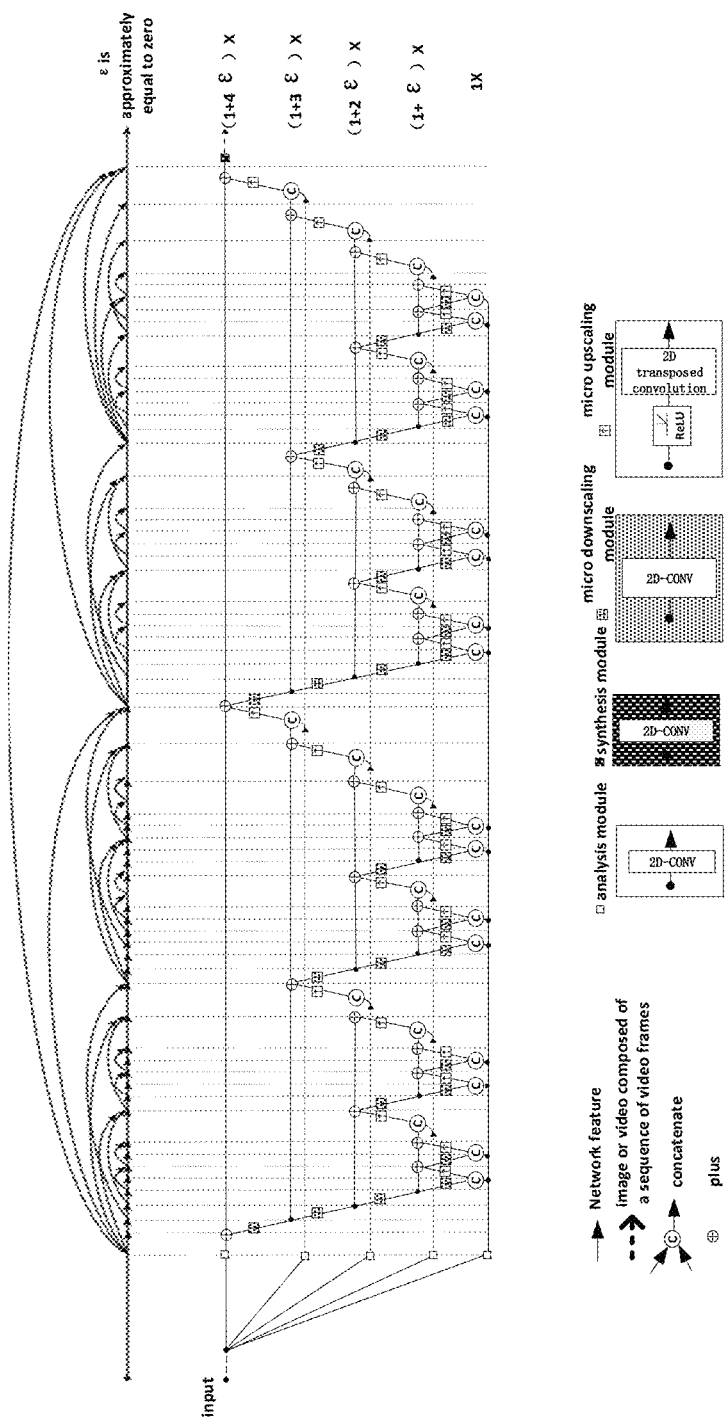
FIG. 2 is a schematic view showing an image processing network according to an embodiment of the present disclosure.

In some embodiments of the present disclosure, optionally, the image processing network includes a plurality of analysis modules, and the inputting the image to be processed into the analysis module to perform feature analysis and outputting the feature tensor image, includes: inputting the image to be processed into the plurality of analysis modules to perform feature analysis and outputting feature tensor images each having the predetermined quantity of channels, where the quantities of channels of the feature tensor images outputted by the analysis modules are different from each other. As shown in FIG. 2, the image processing network includes five analysis modules. In other embodiments of the present disclosure, the quantity of the analysis modules is not limited to two, which will not be particularly defined herein.

In the embodiment of the present disclosure, optionally, the plurality of analysis modules is sequentially arranged in an order where the quantities of output channels are from large to small, and the quantities of output channels of two adjacent analysis modules are of an M times relationship, where M is an integer greater than one. For example, as shown in FIG. 2, in the order from bottom to top, five analysis modules are sequentially arranged in the order where the quantities of output channels are from large to small, e.g., 256, 128, 64, 32 and 16, and the quantities of output channels of two adjacent analysis modules are of a two times relationship.

In the embodiment of the present disclosure, the analysis module may receive various types of images, such as a gray-scale image, an RGB image or a YUV image, and output a feature tensor image. For example, it is presumed that an RGB image having three channels of R, G and B is the inputted into the analysis module, the analysis module may output an image having a predetermined quantity (16, 32, 64, 128, 256, etc.) of channels.

In the embodiment of the present disclosure, optionally, the analysis module is implemented by using a single convolution layer.

In the embodiment of the present disclosure, optionally, each processing module includes: a plurality of micro upscaling modules and a plurality of micro downscaling modules, the plurality of micro upscaling modules and the plurality of micro downscaling modules are coupled to each other to form the processing module, and the inputting the feature tensor image into the processing module for processing and outputting the processed feature tensor image, includes: inputting the feature tensor image into each micro upscaling module for micro upscaling processing, and outputting a micro-upscaling-processed feature tensor image, where the quantity of channels of the feature tensor image outputted by the micro upscaling module is less than the quantity of channels of the inputted feature tensor image, and a resolution of the feature tensor image outputted by the micro upscaling module is greater than a resolution of the inputted feature tensor image; inputting the feature tensor image into each micro downscaling module for micro downscaling processing, and outputting a micro-downscaling-processed feature tensor image, where the quantity of channels of the feature tensor image outputted by the micro downscaling module is greater than the quantity of channels of the inputted feature tensor image, and a resolution of the feature tensor image outputted by the micro downscaling module is less than the resolution of the inputted feature tensor image.

In the embodiment of the present disclosure, padding of the micro upscaling module is set to zero. The "padding" refers to a method for increasing a size of the feature tensor image that has been through a convolution kernel, so as to compensate for the size decreased during computation. In other words, in the embodiment of the present disclosure, instead of performing padding on the feature tensor image after convolution, some pixels are added directly at a border of the feature tensor image during convolution, so as to enable the resolution of the outputted feature tensor images is slightly larger than the resolution of the inputted feature tensor image. For example, if a convolution kernel size is 3×3, one row of pixels may be added into the left, right, top, and bottom of the feature tensor image. Further, optionally, a ratio of the resolution of the feature tensor image outputted by each micro upscaling module to the resolution of the feature tensor image inputted into the micro upscaling module is 1+ε, where ε is a value greater than zero and less than one. For example, if a resolution of an inputted feature tensor image is 640×640 and a convolution kernel size is 3×3 (adding one row of pixels vertically and horizontally), $\varepsilon$=(1+1)/640=0.31%. When the micro upscaling module processes the inputted feature tensor image, the outputted feature tensor image has a smaller quantity of output channels and a higher resolution (compared with the inputted feature tensor image). In the embodiment of the present disclosure, optionally, each micro upscaling module is implemented by using a transposed convolution layer with a stride of 1.

In the embodiment of the present disclosure, optionally, padding of the micro downscaling module is set to 0. In other words, in the embodiment of the present disclosure, instead of performing padding on the feature tensor image after convolution, some pixels are reduced directly at a border of the feature tensor image during convolution, so as to enable the resolution of the outputted feature tensor images is slightly smaller than the resolution of the inputted feature tensor image. For example, if the convolution kernel size is 3×3, one row of pixels may be reduced at the left, right, top, and bottom of the feature tensor image. Further, optionally, a ratio of the resolution of the feature tensor image inputted into each micro downscaling module to the resolution of the feature tensor image outputted by the micro downscaling module is 1+δ, where & is a value greater than zero and less than one. When the micro downscaling module processes the inputted feature tensor image, the outputted feature tensor image has a larger quantity of output channels and a lower resolution (compared with the inputted feature tensor image). In the embodiment of the present disclosure, optionally, each micro downscaling module is implemented by using a convolution layer with a stride of 1.

In the embodiment of the present disclosure, optionally, the synthesizing at least one feature tensor image outputted by the at least one processing module by the synthesis module to obtain the output image includes: synthesizing, by the synthesis module, the at least one feature tensor image to obtain the output image of a same format as the image to be processed, where the quantity of channels of the output image is the same with the quantity of channels of the image to be processed. The resolution of the output image outputted by the synthesis module is equal to the resolution of the inputted image to be processed. In other words, the synthesis module may receive a feature tensor image having an arbitrary quantity of channels and output the output image having the same resolution as the image to be processed inputted into the image processing network. For example, the synthesis module may reduce the quantity of channels to 3 channels (R, G and B) or one channel (gray-scale). In the embodiments of the present disclosure, optionally, the synthesis module is implemented by using a single convolution layer.

In the embodiment of the present disclosure, optionally, the plurality of analysis modules is sequentially arranged in an order where the quantities of output channels are from large to small, and in each processing module, the feature tensor image outputted by each analysis module and feature tensor images outputted by all previous analysis modules and a last analysis module that are processed by the micro upscaling modules and/or the micro downscaling modules are concatenated and outputted.

In FIG. 2, a plus indicates that an addition operation is performed on an array (also referred to as a matrix, a vector, a tensor or a feature map).

In the embodiment of the present disclosure, optionally, the image processing network includes a plurality of processing modules connected in sequence, and an output of a previous processing module serves as an input of a subsequent processing module.

In the embodiment of the present disclosure, as shown in FIG. 2, one input image is adopted in the image processing network, and, during the image processing, the resolution of the input image may be reduced to the resolution levels of (1+4ε)×, (1+3 ε)×, (1+2 ε)×, (1+ε)× and 1×.

As shown in FIG. 2, the image processing network is of a W-cycle structure, where the number of "W" is two. In some other embodiments of the present disclosure, the number of "W" may also be more than two, which will not be particularly defined herein. Because the input image is available at all quantity levels of channels from the first step, the W-cycle runs at its full multi-quantity-of-channels capacity similar to a full-multigrid algorithm. The back projection provides small skip connections at low resolution and long skip connections at high resolution, so in the embodiments of the present application, the image processing network may be referred to as a micro-grid back-projection (mGBP) network.

In the embodiment of the present disclosure, the multi-level micro-grid back-projection method is used, so it is able to avoid the signal decimation process (such as various types of down-sampling modes, various types of pooling operations, and dilated convolution) in the existing method through micro upscaling and downscaling. Therefore, it is able to keep the high resolution of the original input image in various parts of the whole processing system, thereby to avoid the loss of important information about the original image and a feature map of the system during the processing.

Figure 3:
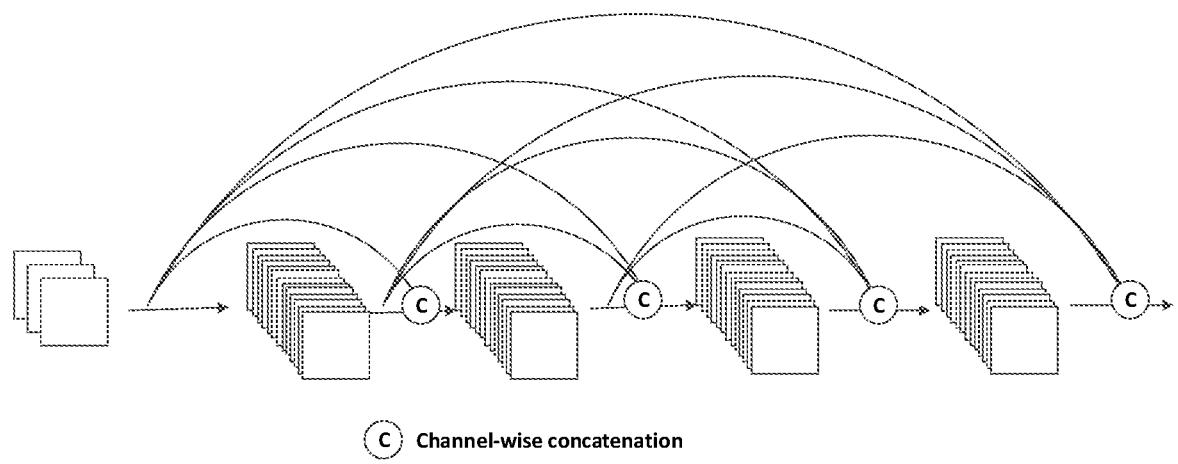
FIG. 3 is a schematic view showing a dense network according to an embodiment of the present disclosure.

Furthermore, referring to FIG. 2, in the embodiment of the present disclosure, the image processing network is similar to a dense connected network, and a skip connection may be provided. The dense connected network, referring to FIG. 3, refers to that the convolution layers are connected sequentially, and skip connections are added between every two layers. The number of connections grows exponentially, and gradients during back propagation may access any layer in the network in one step. Every two layers of all layers in the network are connected, so each layer in the network may receive features of all previous layers as an input. The concepts of d feature-share and connection between any two layers are proposed, so as to mitigate greatly the problem that the gradient of a deep network is vanished during training it is difficult to optimize, and reduce a size and computation amount of the image processing network.

In the embodiment of the present disclosure, the image processing method is an undecimated, original-resolution maintained, and multiple levels image transformation method.

The image processing network may be applied to the convolutional neural network, other deep neural networks, and a non-deep learning network.

In the embodiments of the present disclosure, a single image or a video composed of a sequence of video frames may be processed through the image processing method. Referring to FIG. 2, when the image processing method is used to process the single image, each module in the image processing network is implemented by using a 2D convolution layer, and when the image processing method is used to process the video composed of the sequence of frames, each module in the image processing network is implemented by using a 3D convolution layer.

In the embodiment of the present disclosure, in the above-mentioned training process of the image processing network, a loss function of fidelity (distortion) may be used to determine a loss of the image processing network, and the loss function of fidelity is: $L^{L1}(x, y)=E[|x-y|]$, where E represents an expected value approximated by the average over a set of sample patches, x is an expected value, and y is a true value. L1 refers to that the loss function of the fidelity is L1 loss.

During the training process of the above-mentioned image processing network, the following index may be used to validate the image processing network:

$Y=L^{L2}(x,y)$ where, $L^{L2}(x, y)=E[(x-y)^2]$ is equivalent to a mean square error (MSE) directly related with the fidelity metric PSNR (peak signal to noise ratio). L2 is referred to as L2 loss.

In summary, the image processing method in the embodiment of the present disclosure has the following advantages.

1) The processing module in the image processing network performs undecimated operation on the inputted feature tensor image, so as to avoid the information loss of the feature tensor image caused by the decimation operation during the image processing and improve the image processing effect.

2) The image processing network has a hierarchical structure that makes the skip connections grow linearly, rather than exponentially. As a consequence, a dense structure is possible in the present disclosure.

In the embodiments of the present disclosure, the image processing method may be applied to such aspects as restoration, reconstruction or enhancement of an image that maintains the original resolution.

Figure 4:
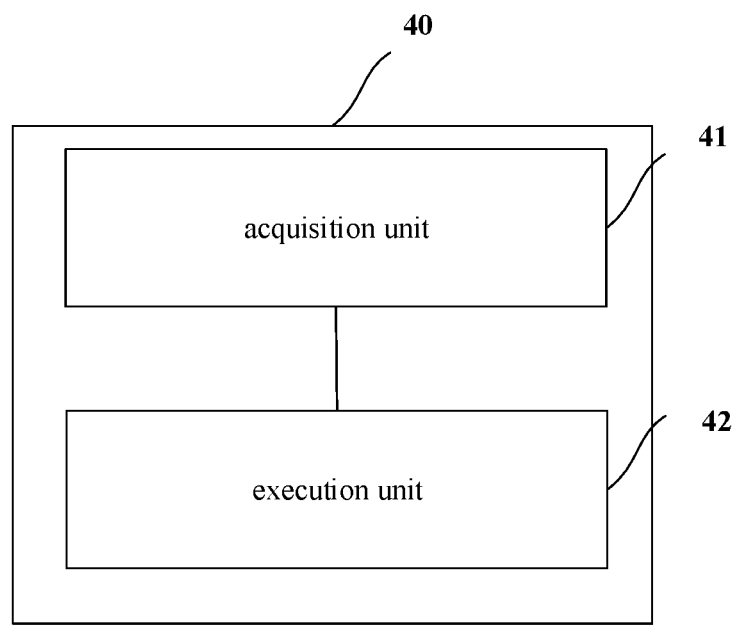
FIG. 4 is a schematic view showing an image processing device according to an embodiment of the present disclosure.

Referring to FIG. 4, an undecimated image processing device 40 is further provided in the embodiment of the present disclosure, which includes: an acquisition unit 41, configured to acquire the image to be processed, an execution unit 42, configured to input the image to be processed into an image processing network to obtain the output image, where a resolution of the output image is the same with a resolution of the image to be processed. The image processing network includes: an analysis module, a synthesis module and at least one processing module, the inputting the image to be processed into the image processing network to obtain the output image includes: inputting the image to be processed into the analysis module to perform the feature analysis, and outputting a feature tensor image; inputting the feature tensor image into the processing module for processing and outputting a processed feature tensor image, where a resolution of the feature tensor image outputted by the processing module is the same with the resolution of the image to be processed; and synthesizing, by the synthesis module, at least one feature tensor image outputted by the at least one processing module to obtain the output image.

In a possible embodiment of the present disclosure, the image processing network includes a plurality of analysis modules, and the execution unit is further configured to: input the image to be processed into the plurality of analysis modules to perform feature analysis and output feature tensor images each having the predetermined quantity of channels, where the quantities of channels of the feature tensor images outputted by the analysis modules are different from each other.

In a possible embodiment of the present disclosure, each processing module includes: a plurality of micro upscaling modules and a plurality of micro downscaling modules, and the plurality of micro upscaling modules and the plurality of micro downscaling modules are coupled to each other to form the processing module. Each micro upscaling module is configured to perform micro upscaling processing, and output a micro-upscaling-processed feature tensor image, where the quantity of channels of the feature tensor image outputted by the micro upscaling module is less than the quantity of channels of the inputted feature tensor image, and a resolution of the feature tensor image outputted by the micro upscaling module is greater than a resolution of the inputted feature tensor image. Each micro downscaling module is configured to perform micro downscaling processing, and output a micro-downscaling-processed feature tensor image, where the quantity of channels of the feature tensor image outputted by the micro downscaling module is greater than the quantity of channels of the inputted feature tensor image, and a resolution of the feature tensor image outputted by the micro downscaling module is less than the resolution of the inputted feature tensor image.

The plurality of analysis modules is sequentially arranged in an order where the quantities of output channels are from large to small, and in each processing module, the feature tensor image outputted by each analysis module and feature tensor images outputted by all previous analysis modules and a last analysis module that are processed by the micro upscaling modules and/or the micro downscaling modules are concatenated and outputted.

In a possible embodiment of the present disclosure, the synthesis module is configured to: synthesize the at least one feature tensor image to obtain the output image of a same format as the image to be processed, where the quantity of channels of the output image is the same with the quantity of channels of the image to be processed.

In a possible embodiment of the present disclosure, the image processing network includes a plurality of processing modules connected in sequence, and an output of a previous processing module serves as an input of a subsequent processing module.

In a possible embodiment of the present disclosure, the quantities of output channels of two adjacent analysis modules are of an M times relationship, where M is an integer greater than one.

In a possible embodiment of the present disclosure, a ratio of the resolution of the feature tensor image outputted by each micro upscaling module to the resolution of the feature tensor image inputted into the micro upscaling module is $1+\varepsilon$, where $\varepsilon$ is a value greater than zero and less than one.

In a possible embodiment of the present disclosure, a ratio of the resolution of the feature tensor image inputted into each micro downscaling module to the resolution of the feature tensor image outputted by the micro downscaling module is $1+\varepsilon$, where $\varepsilon$ is a value greater than zero and less than one.

In a possible embodiment of the present disclosure, the analysis module is implemented by using a single convolution layer.

In a possible embodiment of the present disclosure, the synthesis module is implemented by using a single convolution layer.

In a possible embodiment of the present disclosure, each micro upscaling module is implemented by using a transposed convolution layer with a stride of 1.

In a possible embodiment of the present disclosure, each micro downscaling module is implemented by using a convolution layer with a stride of 1.

Figure 5:
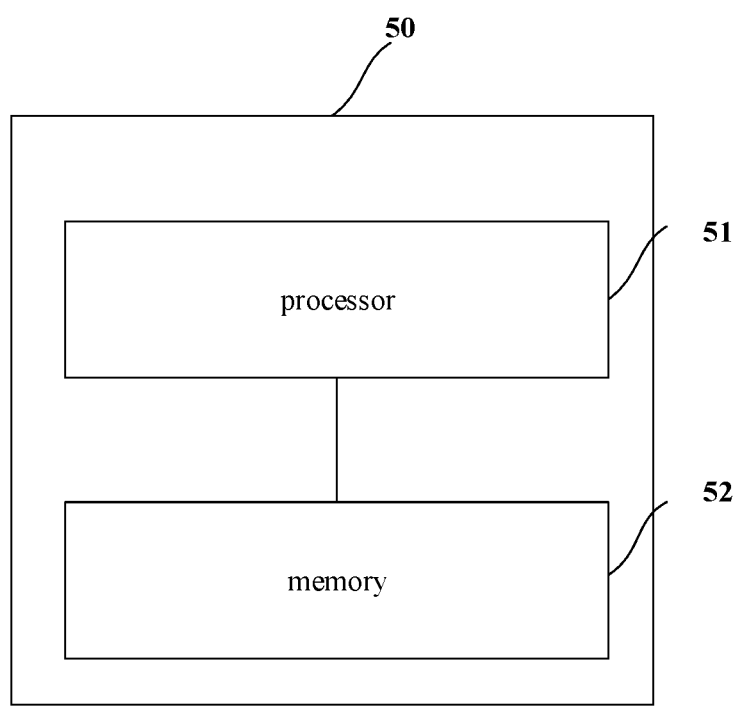
FIG. 5 is a schematic view showing an electronic device according to an embodiment of the present disclosure.

Referring to FIG. 5, an electronic device 50 is further provided in the embodiment of the present disclosure, which includes a processor 51, a memory 52, and a program or instruction stored on the memory 52 and executable on the processor 51, the program or instruction is executed by the processor 51 to perform the above-mentioned undecimated image processing method, with a same beneficial effect, which will not be particularly defined herein.

A computer readable storage medium having stored thereon a program or an instruction is further provided in the embodiments of the present disclosure, the program or the instruction is executed by the processor to perform the above-mentioned undecimated image processing method, with a same beneficial effect, which will not be particularly defined herein. The computer readable storage medium may be, such as a read-only memory (ROM), a random access memory (RAM), a magnetic disk or an optical disk.

It should be appreciated that a term "include", "have" or any other variation thereof is intended to encompass non-exclusive inclusion, such that a process, method, product or device including a series of elements includes not only those elements, but also other elements not explicitly listed, or elements inherent to the process, method, product or device. Without more restrictions, an element defined by an expression "including a . . . " does not exclude the existence of other identical elements in the process, method, product or device including the element.

Base on the above, a person skilled in the art may clearly understand that the above-mentioned method may be implemented by using software with essential universal hardware platform. Based on such understanding, the technical scheme of the present disclosure may be implemented in the form of software products which are stored in a non-volatile storage medium (e.g., a ROM/RAM, a disk, or a compact disc). The software includes instructions for a terminal device (e.g., a mobile phone, a personal computer, a server, an air-conditioner or a networked device, etc.) to execute the method described in the embodiments of the present disclosure.

In the embodiments of the present disclosure, modules, units or subunits may be implemented by software to be executed by various types of processors. For example, an identified executable code module may include one or more physical or logical blocks including computer instructions, which may be constructed as an object, process, or function, for example. However, an executable code of the identified module does not need to be physically located together, but may include different instructions stored in different locations that, in a case that the different instructions are logically combined, the instructions constitute the modules and achieve the specified purpose of the module.

A corresponding hardware circuit may be designed by a person skilled in the art to realize the modules, units or subunits, without considering a cost. The hardware circuit includes a conventional Very Large Scale Integrated (VLSI) circuit or a gate array and a related semiconductor such as a logic chip, a transistor, or other discrete elements. The module may also be implemented by a programmable hardware device, such as a Field Programmable Gate Array, a programmable array logic, a programmable logic device, and the like.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. An undecimated image processing method, comprising:
    acquiring an image to be processed;
    inputting the image to be processed into an image processing network, to obtain an output image, wherein a resolution of the output image is the same with a resolution of the image to be processed,
    wherein the image processing network comprises: an analysis module, a synthesis module and at least one processing module, the inputting the image to be processed into the image processing network to obtain the output image comprises:
    inputting the image to be processed into the analysis module to perform feature analysis, and outputting a feature tensor image;
    inputting the feature tensor image into the processing module for processing, and outputting a processed feature tensor image, wherein a resolution of the feature tensor image outputted by the processing module is the same with the resolution of the image to be processed; and synthesizing, by the synthesis module, at least one feature tensor image outputted by the at least one processing module to obtain the output image;

wherein the image processing network comprises a plurality of analysis modules, and the inputting the image to be processed into the analysis module into perform feature analysis and outputting the feature tensor image, comprises:

inputting the image to be processed into the plurality of analysis modules to perform feature analysis and outputting feature tensor images each having the predetermined quantity of channels, wherein the quantities of channels of the feature tensor images outputted by the analysis modules are different from each other;

wherein each processing module comprises: a plurality of micro upscaling modules and a plurality of micro downscaling modules, the plurality of micro upscaling modules and the plurality of micro downscaling modules are coupled to each other to form the processing module, and the inputting the feature tensor image into the processing module for processing and outputting the processed feature tensor image, comprises:

inputting the feature tensor image into each micro upscaling module for micro upscaling processing, and outputting a micro-upscaling-processed feature tensor image, wherein the quantity of channels of the feature tensor image outputted by the micro upscaling module is less than the quantity of channels of the feature tensor image inputted into the micro upscaling module, and a resolution of the feature tensor image outputted by the micro upscaling module is greater than a resolution of the feature tensor image inputted into the micro upscaling module;

inputting the feature tensor image into each micro downscaling module for micro downscaling processing, and outputting a micro-downscaling-processed feature tensor image, wherein the quantity of channels of the feature tensor image outputted by the micro downscaling module is greater than the quantity of channels of the feature tensor image inputted to the micro downscaling module, and a resolution of the feature tensor image outputted by the micro downscaling module is less than the resolution of the feature tensor image inputted to the micro downscaling module, wherein the plurality of analysis modules is sequentially arranged in an order where the quantities of output channels of the analysis modules are from large to small, and in each processing module, the feature tensor image outputted by each analysis module and feature tensor images outputted by all previous analysis modules and a last analysis module that are processed by the micro upscaling modules and/or the micro downscaling modules are concatenated and outputted;

wherein a ratio of the resolution of the feature tensor image outputted by each micro upscaling module to the resolution of the feature tensor image inputted into the micro upscaling module is 1+ε, wherein ε is a value greater than zero and less than one.

2. The method according to claim 1, wherein the synthesizing at least one feature tensor image outputted by the at least one processing module by the synthesis module to obtain the output image comprises:

synthesizing, by the synthesis module, the at least one feature tensor image to obtain the output image of a same format as the image to be processed, wherein the quantity of channels of the output image is the same with the quantity of channels of the image to be processed.

3. The method according to claim 1, wherein the image processing network comprises a plurality of processing modules connected in sequence, and an output of a previous processing module serves as an input of a subsequent processing module.

4. The method according to claim 1, wherein the quantities of output channels of two adjacent analysis modules are of an M times relationship, wherein M is an integer greater than one.

5. The method according to claim 1, wherein the analysis module is implemented by using a single convolution layer.

6. The method according to claim 1, wherein the synthesis module is implemented by using a single convolution layer.

7. The method according to claim 1, wherein each micro upscaling module is implemented by using a transposed convolution layer with a stride of 1.

8. The method according to claim 1, wherein each micro downscaling module is implemented by using a convolution layer with a stride of 1.

9. A non-transitory computer readable storage medium having stored thereon a program or an instruction, wherein the program or the instruction is executed by the processor to perform the undecimated image processing method according to claim 1.

10. The non-transitory computer readable storage medium according to claim 9, wherein a ratio of the resolution of the feature tensor image inputted into each micro downscaling module to the resolution of the feature tensor image outputted by the micro downscaling module is 1+ε, wherein ε is a value greater than zero and less than one.

11. An undecimated image processing method, comprising:

acquiring an image to be processed;

inputting the image to be processed into an image processing network, to obtain an output image, wherein a resolution of the output image is the same with a resolution of the image to be processed, wherein the image processing network comprises: an analysis module, a synthesis module and at least one processing module, the inputting the image to be processed into the image processing network to obtain the output image comprises:

inputting the image to be processed into the analysis module to perform feature analysis, and outputting a feature tensor image;

inputting the feature tensor image into the processing module for processing, and outputting a processed feature tensor image, wherein a resolution of the feature tensor image outputted by the processing module is the same with the resolution of the image to be processed; and synthesizing, by the synthesis module, at least one feature tensor image outputted by the at least one processing module to obtain the output image;

wherein the image processing network comprises a plurality of analysis modules, and the inputting the image to be processed into the analysis module into perform feature analysis and outputting the feature tensor image, comprises:

inputting the image to be processed into the plurality of analysis modules to perform feature analysis and outputting feature tensor images each having the predetermined quantity of channels, wherein the quantities of channels of the feature tensor images outputted by the analysis modules are different from each other;

wherein each processing module comprises: a plurality of micro upscaling modules and a plurality of micro downscaling modules, the plurality of micro upscaling modules and the plurality of micro downscaling modules are coupled to each other to form the processing module, and the inputting the feature tensor image into the processing module for processing and outputting the processed feature tensor image, comprises:

inputting the feature tensor image into each micro upscaling module for micro upscaling processing, and outputting a micro-upscaling-processed feature tensor image, wherein the quantity of channels of the feature tensor image outputted by the micro upscaling module is less than the quantity of channels of the feature tensor image inputted into the micro upscaling module, and a resolution of the feature tensor image outputted by the micro upscaling module is greater than a resolution of the feature tensor image inputted into the micro upscaling module;

inputting the feature tensor image into each micro downscaling module for micro downscaling processing, and outputting a micro-downscaling-processed feature tensor image, wherein the quantity of channels of the feature tensor image outputted by the micro downscaling module is greater than the quantity of channels of the feature tensor image inputted to the micro downscaling module, and a resolution of the feature tensor image outputted by the micro downscaling module is less than the resolution of the feature tensor image inputted to the micro downscaling module, wherein the plurality of analysis modules is sequentially arranged in an order where the quantities of output channels of the analysis modules are from large to small, and in each processing module, the feature tensor image outputted by each analysis module and feature tensor images outputted by all previous analysis modules and a last analysis module that are processed by the micro upscaling modules and/or the micro downscaling modules are concatenated and outputted;

wherein a ratio of the resolution of the feature tensor image inputted into each micro downscaling module to the resolution of the feature tensor image outputted by the micro downscaling module is $1+\varepsilon$, wherein $\varepsilon$ is a value greater than zero and less than one.

12. An electronic device, comprising a processor, a memory, and a program or an instruction stored on the memory and executable on the processor, wherein the program or instruction is executed by the processor to perform an undecimated image processing method, comprising:

acquiring an image to be processed;

inputting the image to be processed into an image processing network, to obtain an output image, wherein a resolution of the output image is the same with a resolution of the image to be processed, wherein the image processing network comprises: an analysis module, a synthesis module and at least one processing module, the inputting the image to be processed into the image processing network to obtain the output image comprises:

inputting the image to be processed into the analysis module to perform feature analysis, and outputting a feature tensor image;

inputting the feature tensor image into the processing module for processing, and outputting a processed feature tensor image, wherein a resolution of the feature tensor image outputted by the processing module is the same with the resolution of the image to be processed; and synthesizing, by the synthesis module, at least one feature tensor image outputted by the at least one processing module to obtain the output image;

wherein the image processing network comprises a plurality of analysis modules, and the inputting the image to be processed into the analysis module into perform feature analysis and outputting the feature tensor image, comprises:

inputting the image to be processed into the plurality of analysis modules to perform feature analysis and outputting feature tensor images each having the predetermined quantity of channels, wherein the quantities of channels of the feature tensor images outputted by the analysis modules are different from each other;

wherein each processing module comprises: a plurality of micro upscaling modules and a plurality of micro downscaling modules, the plurality of micro upscaling modules and the plurality of micro downscaling modules are coupled to each other to form the processing module, and the inputting the feature tensor image into the processing module for processing and outputting the processed feature tensor image, comprises:

inputting the feature tensor image into each micro upscaling module for micro upscaling processing, and outputting a micro-upscaling-processed feature tensor image, wherein the quantity of channels of the feature tensor image outputted by the micro upscaling module is less than the quantity of channels of the feature tensor image inputted into the micro upscaling module, and a resolution of the feature tensor image outputted by the micro upscaling module is greater than a resolution of the feature tensor image inputted into the micro upscaling module;

inputting the feature tensor image into each micro downscaling module for micro downscaling processing, and outputting a micro-downscaling-processed feature tensor image, wherein the quantity of channels of the feature tensor image outputted by the micro downscaling module is greater than the quantity of channels of the feature tensor image inputted to the micro downscaling module, and a resolution of the feature tensor image outputted by the micro downscaling module is less than the resolution of the feature tensor image inputted to the micro downscaling module, wherein the plurality of analysis modules is sequentially arranged in an order where the quantities of output channels of the analysis modules are from large to small, and in each processing module, the feature tensor image outputted by each analysis module and feature tensor images outputted by all previous analysis modules and a last analysis module that are processed by the micro upscaling modules and/or the micro downscaling modules are concatenated and outputted;

wherein a ratio of the resolution of the feature tensor image outputted by each micro upscaling module to the resolution of the feature tensor image inputted into the micro upscaling module is $1+\varepsilon$, wherein $\varepsilon$ is a value greater than zero and less than one.

13. The electronic device according to claim 12, wherein the synthesizing at least one feature tensor image outputted by the at least one processing module by the synthesis module to obtain the output image comprises:

synthesizing, by the synthesis module, the at least one feature tensor image to obtain the output image of a same format as the image to be processed, wherein the quantity of channels of the output image is the same with the quantity of channels of the image to be processed.

14. The electronic device according to claim 12, wherein the image processing network comprises a plurality of processing modules connected in sequence, and an output of a previous processing module serves as an input of a subsequent processing module.

15. The electronic device according to claim 12, wherein the quantities of output channels of two adjacent analysis modules are of an M times relationship, wherein M is an integer greater than one.

16. The electronic device according to claim 12, wherein the analysis module is implemented by using a single convolution layer.

17. The electronic device according to claim 12, wherein the synthesis module is implemented by using a single convolution layer.

18. The electronic device according to claim 12, wherein each micro upscaling module is implemented by using a transposed convolution layer with a stride of 1.

19. The electronic device according to claim 12, wherein each micro downscaling module is implemented by using a convolution layer with a stride of 1.

20. The electronic device according to claim 12, wherein a ratio of the resolution of the feature tensor image inputted into each micro downscaling module to the resolution of the feature tensor image outputted by the micro downscaling module is 1+ε, wherein ε is a value greater than zero and less than one.

* * * * *